(12) United States Patent
Oliynyk et al.

(10) Patent No.: US 12,539,139 B2
(45) Date of Patent: Feb. 3, 2026

(54) ATHERECTOMY SYSTEM WITH REUSABLE PORTION AND SINGLE USE PORTION

(71) Applicant: Boston Scientific Scimed, Inc., Maple Grove, MN (US)

(72) Inventors: Marianna Oliynyk, Saint Louis Park, MN (US); Travis J. Schauer, Rockford, MN (US); Brett Struthers, Victoria, MN (US); Marit Elisabeth Woulfe, Ramsey, MN (US); Michael Kaland, Minneapolis, MN (US); Corydon Carlson, Stilwater, MN (US); Daniel Frank Massimini, Brooklyn Park, MN (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 657 days.

(21) Appl. No.: 17/888,716

(22) Filed: Aug. 16, 2022

(65) Prior Publication Data
US 2023/0048053 A1 Feb. 16, 2023

Related U.S. Application Data

(60) Provisional application No. 63/233,461, filed on Aug. 16, 2021.

(51) Int. Cl.
| | |
|---|---|
| *A61B 17/3207* | (2006.01) |
| *A61B 17/22* | (2006.01) |
| *A61B 17/32* | (2006.01) |

(52) U.S. Cl.
CPC ........ *A61B 17/320758* (2013.01); *A61B 17/320725* (2013.01); *A61B 2017/22038* (2013.01); *A61B 2017/320004* (2013.01)

(58) Field of Classification Search
CPC ........ A61B 17/3207; A61B 17/320725; A61B 17/320758; A61B 2017/0023;
(Continued)

(56) References Cited

U.S. PATENT DOCUMENTS

| | | |
|---|---|---|
| 2,088,654 A | 8/1937 | Hull |
| 3,913,196 A | 10/1975 | Maday |

(Continued)

FOREIGN PATENT DOCUMENTS

| | | |
|---|---|---|
| CA | 2682488 A1 | 10/2008 |
| DE | 202005022017 U1 | 5/2012 |

(Continued)

OTHER PUBLICATIONS

International Search Report and Written Opinion dated Aug. 20, 2019 for International Application No. PCT/US2019/033748.
(Continued)

*Primary Examiner* — Jocelin C Tanner
(74) *Attorney, Agent, or Firm* — Seager, Tufte & Wickhem, LLP

(57) ABSTRACT

An atherectomy system includes a drive assembly and an advancer assembly. The drive assembly, which may be reusable, includes a drive motor having an output shaft and a first coupler segment that is secured relative to the output shaft. A controller may be adapted to regulate operation of the drive motor. The advancer assembly, which may be single use, includes a flexible drive cable that is adapted to be releasably securable to the first coupler segment. The advancer assembly includes gearing that is secured within the advancer assembly and is operably coupled with the flexible drive cable. A burr catheter is coupled with and extends distally of the gearing. The advancer assembly is adapted to enable relative translation of the burr catheter in (Continued)

order to advance and withdraw an atherectomy burr rotatably secured to a distal end of the burr catheter.

20 Claims, 16 Drawing Sheets

(58) Field of Classification Search
CPC .......... A61B 2017/00398; A61B 2017/22038; A61B 2017/320004; A61B 2034/301; A61M 25/0113
USPC ........................................................ 606/159
See application file for complete search history.

(56) References Cited

U.S. PATENT DOCUMENTS

| | | |
|---|---|---|
| 4,395,167 A | 7/1983 | Maternus |
| 4,507,028 A | 3/1985 | Matsushita |
| 4,679,557 A | 7/1987 | Opie et al. |
| 5,019,089 A | 5/1991 | Farr |
| 5,116,350 A | 5/1992 | Stevens |
| 5,287,858 A | 2/1994 | Hammerslag et al. |
| 5,308,354 A | 5/1994 | Zacca et al. |
| 5,314,407 A | 5/1994 | Auth et al. |
| 5,417,703 A | 5/1995 | Brown et al. |
| 5,478,344 A | 12/1995 | Stone et al. |
| 5,501,694 A | 3/1996 | Ressemann et al. |
| 5,540,707 A | 7/1996 | Ressemann et al. |
| 5,563,481 A | 10/1996 | Krause |
| 5,572,609 A | 11/1996 | Li |
| 5,626,444 A | 5/1997 | Campian |
| 5,632,755 A | 5/1997 | Nordgren et al. |
| 5,674,235 A | 10/1997 | Parisi |
| 5,681,336 A | 10/1997 | Clement et al. |
| 5,709,661 A | 1/1998 | Van Egmond et al. |
| 5,766,192 A | 6/1998 | Zacca |
| 5,779,722 A | 7/1998 | Shturman et al. |
| 5,823,990 A | 10/1998 | Henley |
| 5,827,323 A | 10/1998 | Klieman et al. |
| 5,836,868 A | 11/1998 | Ressemann et al. |
| 5,899,915 A | 5/1999 | Saadat |
| 5,913,867 A | 6/1999 | Dion |
| 6,015,420 A | 1/2000 | Wulfman et al. |
| 6,017,354 A | 1/2000 | Culp et al. |
| 6,086,608 A | 7/2000 | Ek et al. |
| 6,102,926 A | 8/2000 | Tartaglia et al. |
| 6,106,301 A | 8/2000 | Merril |
| 6,113,615 A | 9/2000 | Wulfman |
| 6,120,515 A | 9/2000 | Rogers et al. |
| 6,126,667 A | 10/2000 | Barry et al. |
| 6,139,510 A | 10/2000 | Palermo |
| 6,149,663 A | 11/2000 | Strandberg et al. |
| 6,171,312 B1 | 1/2001 | Beaty |
| 6,200,329 B1 | 3/2001 | Fung et al. |
| 6,212,300 B1 | 4/2001 | Rengakuji |
| 6,234,725 B1 | 5/2001 | Campian |
| 6,270,509 B1 | 8/2001 | Barry et al. |
| 6,312,438 B1 | 11/2001 | Adams |
| 6,494,888 B1 | 12/2002 | Laufer et al. |
| 6,500,186 B2 | 12/2002 | Lafontaine et al. |
| 6,503,227 B1 | 1/2003 | Guo et al. |
| 6,503,261 B1 | 1/2003 | Bruneau et al. |
| 6,506,196 B1 | 1/2003 | Laufer |
| 6,554,845 B1 | 4/2003 | Fleenor et al. |
| 6,569,085 B2 | 5/2003 | Kortenbach et al. |
| 6,579,298 B1 | 6/2003 | Peskin et al. |
| 6,626,917 B1 | 9/2003 | Craig |
| 6,632,230 B2 | 10/2003 | Barry |
| 6,663,639 B1 | 12/2003 | Laufer et al. |
| 6,719,763 B2 | 4/2004 | Chung et al. |
| 6,740,030 B2 | 5/2004 | Martone et al. |
| 6,746,457 B2 | 6/2004 | Dana et al. |
| 6,755,843 B2 | 6/2004 | Chung et al. |
| 6,773,441 B1 | 8/2004 | Laufer et al. |
| 6,808,491 B2 | 10/2004 | Kortenbach et al. |
| 6,818,001 B2 | 11/2004 | Wulfman et al. |
| 6,821,285 B2 | 11/2004 | Laufer et al. |
| 6,835,200 B2 | 12/2004 | Laufer et al. |
| 6,908,427 B2 | 6/2005 | Fleener et al. |
| 6,997,931 B2 | 2/2006 | Sauer et al. |
| 7,056,284 B2 | 6/2006 | Martone et al. |
| 7,063,710 B2 | 6/2006 | Takamoto et al. |
| 7,063,715 B2 | 6/2006 | Onuki et al. |
| 7,094,246 B2 | 8/2006 | Anderson et al. |
| 7,144,401 B2 | 12/2006 | Yamamoto et al. |
| 7,147,646 B2 | 12/2006 | Dana et al. |
| 7,153,314 B2 | 12/2006 | Laufer et al. |
| 7,220,266 B2 | 5/2007 | Gambale |
| 7,232,445 B2 | 6/2007 | Kortenbach et al. |
| 7,235,086 B2 | 6/2007 | Sauer et al. |
| 7,285,130 B2 | 10/2007 | Austin |
| 7,326,221 B2 | 2/2008 | Sakamoto et al. |
| 7,344,545 B2 | 3/2008 | Takemoto et al. |
| 7,347,863 B2 | 3/2008 | Rothe et al. |
| 7,361,180 B2 | 4/2008 | Saadat et al. |
| 7,530,985 B2 | 5/2009 | Takemoto et al. |
| 7,601,161 B1 | 10/2009 | Nobles et al. |
| 7,618,425 B2 | 11/2009 | Yamamoto et al. |
| 7,713,277 B2 | 5/2010 | Laufer et al. |
| 7,722,633 B2 | 5/2010 | Laufer et al. |
| 7,727,246 B2 | 6/2010 | Sixto, Jr. et al. |
| 7,736,373 B2 | 6/2010 | Laufer et al. |
| 7,776,057 B2 | 8/2010 | Laufer et al. |
| 7,776,066 B2 | 8/2010 | Onuki et al. |
| 7,842,051 B2 | 11/2010 | Dana et al. |
| 7,846,180 B2 | 12/2010 | Cerier |
| 7,857,823 B2 | 12/2010 | Laufer et al. |
| 7,896,893 B2 | 3/2011 | Laufer et al. |
| 7,918,867 B2 | 4/2011 | Dana et al. |
| 7,951,157 B2 | 5/2011 | Gambale |
| 7,992,571 B2 | 8/2011 | Gross et al. |
| 7,993,368 B2 | 8/2011 | Gambale et al. |
| 8,016,840 B2 | 9/2011 | Takemoto et al. |
| 8,021,376 B2 | 9/2011 | Takemoto et al. |
| 8,057,494 B2 | 11/2011 | Laufer et al. |
| 8,062,314 B2 | 11/2011 | Sixto, Jr. et al. |
| 8,066,721 B2 | 11/2011 | Kortenbach et al. |
| 8,087,856 B2 | 1/2012 | Reed |
| 8,105,355 B2 | 1/2012 | Page et al. |
| 8,211,123 B2 | 7/2012 | Gross et al. |
| 8,216,253 B2 | 7/2012 | Saadat et al. |
| 8,226,667 B2 | 7/2012 | Viola et al. |
| 8,277,468 B2 | 10/2012 | Laufer et al. |
| 8,287,554 B2 | 10/2012 | Cerier et al. |
| 8,287,556 B2 | 10/2012 | Gilkey et al. |
| 8,308,765 B2 | 11/2012 | Saadat et al. |
| 8,313,496 B2 | 11/2012 | Sauer et al. |
| 8,361,089 B2 | 1/2013 | Chu |
| 8,388,632 B2 | 3/2013 | Gambale |
| 8,425,555 B2 | 4/2013 | Page et al. |
| 8,454,631 B2 | 6/2013 | Viola et al. |
| 8,480,691 B2 | 7/2013 | Dana et al. |
| 8,540,735 B2 | 9/2013 | Mitelberg et al. |
| 8,551,120 B2 | 10/2013 | Gambale |
| 8,556,914 B2 | 10/2013 | Vrba |
| 8,585,720 B2 | 11/2013 | Gross et al. |
| 8,603,123 B2 | 12/2013 | Todd |
| 8,632,553 B2 | 1/2014 | Sakamoto et al. |
| 8,679,136 B2 | 3/2014 | Mitelberg |
| 8,709,022 B2 | 4/2014 | Stone et al. |
| 8,764,771 B2 | 7/2014 | Chu |
| 8,882,785 B2 | 11/2014 | Dicesare et al. |
| 8,926,634 B2 | 1/2015 | Rothe et al. |
| 8,992,570 B2 | 3/2015 | Gambale et al. |
| 9,011,466 B2 | 4/2015 | Overes et al. |
| 9,050,126 B2 | 6/2015 | Rivers et al. |
| 9,050,127 B2 | 6/2015 | Bonnette et al. |
| 9,089,325 B2 | 7/2015 | Mitelberg et al. |
| 9,125,646 B2 | 9/2015 | Woodard, Jr. et al. |
| 9,198,562 B2 | 12/2015 | Mitelberg et al. |
| 9,232,957 B2 | 1/2016 | Adams |
| 9,320,515 B2 | 4/2016 | Dana et al. |
| 9,474,536 B2 | 10/2016 | Carrison et al. |
| 9,486,126 B2 | 11/2016 | West et al. |

(56) References Cited

U.S. PATENT DOCUMENTS

| | | |
|---|---|---|
| 9,504,465 B2 | 11/2016 | Chu |
| 9,510,817 B2 | 12/2016 | Saadat et al. |
| 9,549,728 B2 | 1/2017 | Chu |
| 9,750,494 B2 | 9/2017 | Gross et al. |
| 9,788,831 B2 | 10/2017 | Mitelberg |
| 9,844,366 B2 | 12/2017 | Woodard, Jr. et al. |
| 9,867,610 B2 | 1/2018 | Mitelberg et al. |
| 9,931,488 B2 | 4/2018 | Bunch et al. |
| 10,045,871 B2 | 8/2018 | Saadat et al. |
| 10,052,122 B2 | 8/2018 | Higgins et al. |
| 10,130,437 B2 | 11/2018 | Lee et al. |
| 10,143,463 B2 | 12/2018 | Dana et al. |
| 10,194,902 B2 | 2/2019 | Nobles et al. |
| 10,335,142 B2 | 7/2019 | Raybin et al. |
| 10,736,628 B2 | 8/2020 | Yates et al. |
| 2001/0004700 A1 | 6/2001 | Honeycutt et al. |
| 2001/0037121 A1 | 11/2001 | McGuckin, Jr. et al. |
| 2002/0058956 A1 | 5/2002 | Honeycutt et al. |
| 2002/0107530 A1 | 8/2002 | Sauer et al. |
| 2002/0151917 A1 | 10/2002 | Barry |
| 2002/0161384 A1 | 10/2002 | Wulfman et al. |
| 2003/0093103 A1 | 5/2003 | Malackowski et al. |
| 2003/0204205 A1 | 10/2003 | Sauer et al. |
| 2004/0002699 A1 | 1/2004 | Ryan et al. |
| 2004/0068270 A1 | 4/2004 | Alfred |
| 2004/0138706 A1 | 7/2004 | Abrams et al. |
| 2004/0186368 A1 | 9/2004 | Ramzipoor et al. |
| 2005/0004579 A1 | 1/2005 | Schneider et al. |
| 2005/0015021 A1 | 1/2005 | Shiber |
| 2005/0033319 A1 | 2/2005 | Gambale et al. |
| 2005/0240146 A1 | 10/2005 | Nash et al. |
| 2005/0250985 A1 | 11/2005 | Saadat et al. |
| 2006/0074405 A1 | 4/2006 | Malackowski et al. |
| 2006/0074442 A1 | 4/2006 | Noriega et al. |
| 2006/0142775 A1 | 6/2006 | Heneberry et al. |
| 2006/0282094 A1 | 12/2006 | Stokes et al. |
| 2007/0093841 A1 | 4/2007 | Hoogland |
| 2007/0239140 A1 | 10/2007 | Chechelski et al. |
| 2007/0270908 A1 | 11/2007 | Stokes et al. |
| 2008/0039823 A1 | 2/2008 | Shimogami et al. |
| 2008/0086148 A1 | 4/2008 | Baker et al. |
| 2008/0097499 A1 | 4/2008 | Nash et al. |
| 2008/0146965 A1 | 6/2008 | Privitera et al. |
| 2009/0024085 A1 | 1/2009 | To et al. |
| 2009/0069829 A1 | 3/2009 | Shturman |
| 2009/0124975 A1 | 5/2009 | Oliver et al. |
| 2009/0177031 A1 | 7/2009 | Surti et al. |
| 2010/0125276 A1 | 5/2010 | Palermo |
| 2010/0137681 A1 | 6/2010 | Ewers et al. |
| 2010/0198006 A1 | 8/2010 | Greenburg et al. |
| 2010/0312263 A1 | 12/2010 | Moberg et al. |
| 2011/0077673 A1 | 3/2011 | Grubac et al. |
| 2011/0213391 A1 | 9/2011 | Rivers et al. |
| 2011/0251554 A1 | 10/2011 | Romoscanu |
| 2011/0306995 A1 | 12/2011 | Moberg |
| 2012/0053606 A1 | 3/2012 | Schmitz et al. |
| 2012/0095461 A1 | 4/2012 | Herscher et al. |
| 2012/0130410 A1 | 5/2012 | Tal et al. |
| 2012/0136348 A1 | 5/2012 | Condie et al. |
| 2012/0158023 A1 | 6/2012 | Mitelberg et al. |
| 2012/0172963 A1 | 7/2012 | Ryan et al. |
| 2012/0179167 A1 | 7/2012 | Wenderow et al. |
| 2012/0185031 A1 | 7/2012 | Ryan et al. |
| 2012/0209176 A1 | 8/2012 | Anderson |
| 2012/0271327 A1 | 10/2012 | West et al. |
| 2013/0006248 A1 | 1/2013 | Ellis |
| 2013/0079763 A1 | 3/2013 | Heckel et al. |
| 2013/0096581 A1 | 4/2013 | Gilkey et al. |
| 2013/0103062 A1 | 4/2013 | To et al. |
| 2013/0253552 A1* | 9/2013 | Schoenle ....... A61B 17/320758 606/159 |
| 2013/0274657 A1 | 10/2013 | Zirps et al. |
| 2013/0304093 A1 | 11/2013 | Serina et al. |
| 2014/0100574 A1 | 4/2014 | Bono et al. |
| 2014/0128668 A1 | 5/2014 | Cox et al. |
| 2014/0148835 A1 | 5/2014 | Schmitz et al. |
| 2014/0212457 A1 | 7/2014 | Rifai |
| 2014/0222042 A1 | 8/2014 | Kessler et al. |
| 2014/0249554 A1 | 9/2014 | To et al. |
| 2014/0261453 A1 | 9/2014 | Carlson |
| 2014/0277014 A1 | 9/2014 | Higgins et al. |
| 2014/0316447 A1 | 10/2014 | Ellering et al. |
| 2014/0316448 A1 | 10/2014 | Higgins |
| 2014/0316451 A1 | 10/2014 | Higgins et al. |
| 2014/0324052 A1 | 10/2014 | Carrison et al. |
| 2015/0011834 A1 | 1/2015 | Ayala et al. |
| 2015/0073448 A1 | 3/2015 | Rydberg |
| 2015/0125807 A1 | 5/2015 | Shipley |
| 2015/0126983 A1 | 5/2015 | Alvarado et al. |
| 2015/0164540 A1 | 6/2015 | Higgins et al. |
| 2015/0173776 A1 | 6/2015 | Burke et al. |
| 2015/0173838 A1 | 6/2015 | Murphy et al. |
| 2015/0201956 A1 | 7/2015 | Higgins et al. |
| 2015/0216554 A1 | 8/2015 | Kessler et al. |
| 2015/0327880 A1 | 11/2015 | Wasicek et al. |
| 2015/0335348 A1 | 11/2015 | Cohen et al. |
| 2016/0022307 A1 | 1/2016 | Wasdyke et al. |
| 2016/0045197 A1 | 2/2016 | Mitelberg et al. |
| 2016/0157886 A1 | 6/2016 | WasDyke et al. |
| 2016/0235434 A1 | 8/2016 | Smith et al. |
| 2016/0235441 A1 | 8/2016 | Parkin |
| 2016/0287284 A1 | 10/2016 | Smith et al. |
| 2016/0346003 A1 | 12/2016 | Grothe et al. |
| 2016/0354107 A1 | 12/2016 | Nakano et al. |
| 2017/0086817 A1 | 3/2017 | Mitelberg |
| 2017/0086818 A1 | 3/2017 | Mitelberg |
| 2017/0181760 A1 | 6/2017 | Look et al. |
| 2017/0189123 A1 | 7/2017 | Govari et al. |
| 2017/0273698 A1 | 9/2017 | McGuckin, Jr. et al. |
| 2017/0296200 A1 | 10/2017 | Singer et al. |
| 2018/0042602 A1 | 2/2018 | Mitelberg et al. |
| 2018/0042603 A1 | 2/2018 | Mitelberg et al. |
| 2018/0153381 A1 | 6/2018 | Wei et al. |
| 2018/0183179 A1 | 6/2018 | Byrd et al. |
| 2018/0193056 A1 | 7/2018 | Colyer et al. |
| 2018/0235604 A1 | 8/2018 | Comee et al. |
| 2018/0242998 A1 | 8/2018 | Dhandhusaria et al. |
| 2019/0175211 A1 | 6/2019 | Carlson et al. |
| 2019/0262032 A1* | 8/2019 | Carlson ................ G05B 13/021 |
| 2019/0262034 A1 | 8/2019 | Spangler et al. |
| 2020/0022764 A1 | 1/2020 | Flexman et al. |
| 2020/0060718 A1 | 2/2020 | Patel et al. |
| 2020/0069324 A1 | 3/2020 | Deepa |
| 2020/0214735 A1* | 7/2020 | Carlson .......... A61B 17/320758 |
| 2020/0229844 A1 | 7/2020 | Rawson et al. |
| 2020/0315654 A1 | 10/2020 | Patel et al. |
| 2021/0093348 A1 | 4/2021 | Chida et al. |
| 2021/0172499 A1 | 6/2021 | Nino |
| 2022/0125475 A1* | 4/2022 | Neuharth ....... A61B 17/320758 |
| 2022/0218385 A1 | 7/2022 | Hilse et al. |

FOREIGN PATENT DOCUMENTS

| | | | |
|---|---|---|---|
| EP | 1520509 A1 | 4/2005 | |
| EP | 2011446 A2 | 7/2009 | |
| EP | 2108304 A2 | 10/2009 | |
| EP | 2508141 A1 | 10/2012 | |
| EP | 3053534 A1 | 8/2016 | |
| EP | 3132760 A1 | 2/2017 | |
| EP | 3188668 A1 | 7/2017 | |
| EP | 3192461 A1 | 7/2017 | |
| EP | 3222228 A1 | 9/2017 | |
| EP | 3226784 B1 | 9/2020 | |
| IE | S2009529 A2 | 4/2012 | |
| JP | H10174689 A | 6/1998 | |
| JP | 2001509685 A | 7/2001 | |
| WO | 9629014 A1 | 9/1996 | |
| WO | 9814124 A1 | 4/1998 | |
| WO | 0051511 A1 | 9/2000 | |
| WO | 0056230 A2 | 9/2000 | |
| WO | 2001054595 A1 | 8/2001 | |
| WO | 0189393 A1 | 11/2001 | |
| WO | 0249518 A2 | 6/2002 | |
| WO | 2004080507 A2 | 9/2004 | |

(56) References Cited

FOREIGN PATENT DOCUMENTS

| WO | 2008016592 A2 | 2/2008 |
|---|---|---|
| WO | 2008045376 A2 | 4/2008 |
| WO | 2008098124 A1 | 8/2008 |
| WO | 2010036227 A1 | 4/2010 |
| WO | 2010056714 A1 | 5/2010 |
| WO | 2010089727 A1 | 8/2010 |
| WO | 2011060192 A1 | 5/2011 |
| WO | 2011106053 A1 | 9/2011 |
| WO | 2013158849 A2 | 10/2013 |
| WO | 2014106847 A1 | 7/2014 |
| WO | 2016001932 A1 | 1/2016 |
| WO | 2016144834 A1 | 9/2016 |
| WO | 2016200811 A1 | 12/2016 |
| WO | 2017087856 A1 | 5/2017 |
| WO | 2018156603 A1 | 8/2018 |
| WO | 2019118522 A1 | 6/2019 |
| WO | 2019168784 A1 | 9/2019 |
| WO | 2020055728 A1 | 3/2020 |
| WO | 2020223433 A1 | 11/2020 |

OTHER PUBLICATIONS

International Search Report and Written Opinion dated Oct. 1, 2019 for International Application No. PCT/US2019/038006.
Invitation to Pay Additional Fees dated Sep. 26, 2019 for International Application No. PCT/US2019/037995.
International Search Report and Written Opinion dated Dec. 6, 2019 for International Application No. PCT/US2019/037995.
Invitation to Pay Additional Fees dated Nov. 18, 2019 for International Application No. PCT/US2019/049774.
International Search and Written Opinion dated Sep. 20, 2019 for International Application No. PCT/2019/039312.
International Search Report and Written Opinion dated Jun. 4, 2021 for International Application No. PCT/US2021/017939.
International Search Report and Written opinion dated Mar. 28, 2018 for International Application No. PCT/US2018/013587.
International Search Report and Written Opinion dated Apr. 17, 2019 for International Application No. PCT/US2019/018121.
International Search Report and Written Opinion dated Apr. 26, 2019, for International Application No. PCT/US2019/019404.
"What is a PID Controller: Working & Its Applications, 2013, EL-PRO-CUS, URL:https://www.elprocus.com/the-working-of-a-pid-controller/" 17 pages, (Year:2013).
International Search Report and Written Opinion dated Apr. 26, 2019, for International Application No. PCT/US2019/019631.
International Search Report and Written Opinion dated Apr. 26, 2019, for International Application No. PCT/US2019/0198848.
International Search Report and Written Opinion dated Mar. 30, 2020 for International Application No. PCT/US2020/014062.
International Search Report and Written Opinion dated Jun. 25, 2020 for International Application No. PCT/US2020/012767.
International Search Report and Written Opinion dated Apr. 22, 2020 for International Application No. PCT/US2020/013764.
International Search Report and Written Opinion dated Jun. 24, 2020 for International Application No. PCT/US2020/027079.
International Search Report and Written Opinion dated Sep. 4, 2020 for International Application No. PCT/US2020/038132.
International Search Report and Written Opinion dated Sep. 7, 2020 for International Application No. PCT/US2020/038145.
International Search Report and Written Opinion dated Dec. 8, 2020 for International Application No. PCT/US2020/049999.
Invite to Pay Additional Fees dated Feb. 16, 2021 for International Application No. PCT/US2020/061383.
International Search Report and Written Opinion dated Feb. 22, 2022 for International Application No. PCT/US2021/057279.
International Search Report and Written Opinion dated Jan. 26, 2022 for International Application No. PCT/US2021/056616.
International Search Report and Written Opinion dated Nov. 8, 2022 for International Application No. PCT/US2022/040414.

* cited by examiner

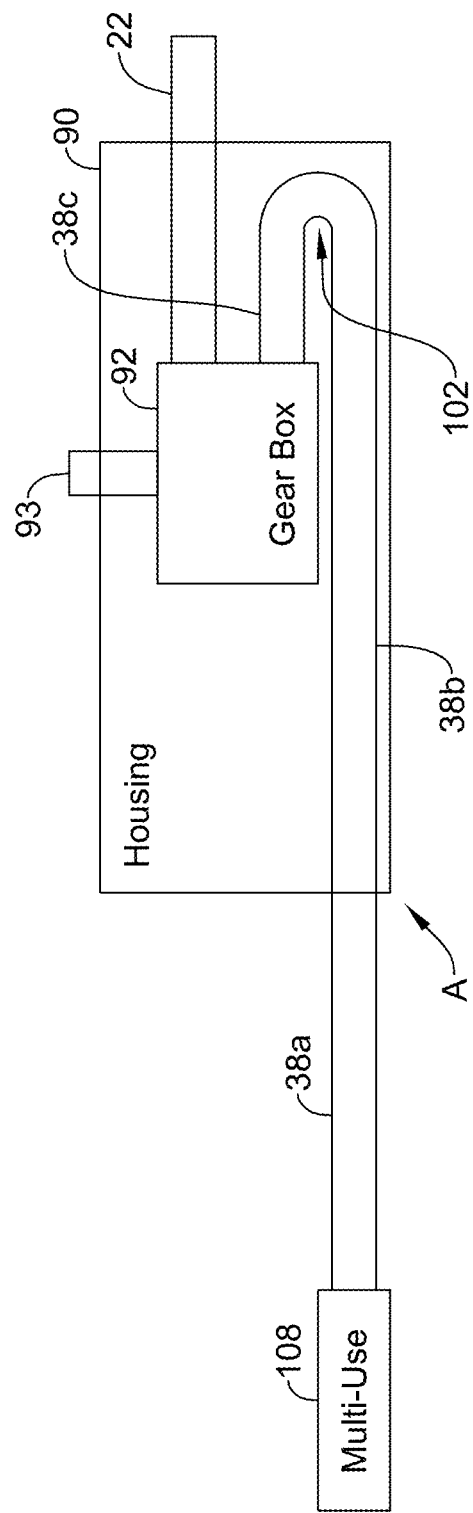

ATHERECTOMY SYSTEM WITH REUSABLE PORTION AND SINGLE USE PORTION

CROSS-REFERENCE TO RELATED APPLICATIONS

This application claims the benefit of priority under 35 U.S.C. § 119 of U.S. Provisional Application No. 63/233,461, filed Aug. 16, 2021, the entire disclosure of which is hereby incorporated by reference.

TECHNICAL FIELD

The present disclosure pertains to medical devices, and methods for manufacturing and using medical devices. More particularly, the disclosure is directed to devices and methods for removing occlusive material from a body lumen. Further, the disclosure is directed to an atherectomy device for forming a passageway through an occlusion of a body lumen, such as a blood vessel.

BACKGROUND

A wide variety of medical devices have been developed for medical use, for example, for use in accessing body cavities and interacting with fluids and structures in body cavities. Some of these devices may include guidewires, catheters, pumps, motors, controllers, filters, grinders, needles, valves, and delivery devices and/or systems used for delivering such devices. These devices are manufactured by any one of a variety of different manufacturing methods and may be used according to any one of a variety of methods. Of the known medical devices and methods, each has certain advantages and disadvantages.

SUMMARY

This disclosure provides design, material, manufacturing method, and use alternatives for medical devices. As an example, an atherectomy system includes a drive assembly that is adapted for reuse and an advancer assembly that is adapted for single use. The drive assembly includes a drive motor having an output shaft and a first coupler segment that is secured relative to the output shaft. The drive assembly includes a controller that is adapted to regulate operation of the drive motor. The advancer assembly includes a flexible drive cable including a second coupler segment adapted to be releasably securable to the first coupler segment, a gearing that is secured within the advancer assembly and operably coupled with the flexible drive cable, and a burr catheter that is coupled with and extends distally of the gearing. The advancer assembly is adapted to enable relative translation of the burr catheter in order to advance and withdraw an atherectomy burr rotatably secured to a distal end of the burr catheter.

Alternatively or additionally, the drive assembly may be a reusable assembly.

Alternatively or additionally, the advancer assembly may be a single use assembly.

Alternatively or additionally, the flexible drive cable may include a second coupler segment adapted to be releasably secured to the first coupler segment to form a rotatable connection between the drive motor and the flexible drive cable.

Alternatively or additionally, the first coupler segment and the second coupler segment may cooperate together to form a rotatable connection.

Alternatively or additionally, the advancer assembly may further include a brake assembly that is adapted to releasably secure a guidewire extending through the burr catheter.

Alternatively or additionally, the advancer assembly may further include a saline source adapted to provide saline through the burr catheter.

Alternatively or additionally, the advancer assembly may further include an advancer housing with the gearing disposed within the advancer housing, and a sled to which the advancer housing is slidingly secured such that sliding the advancer housing in a first direction relative to the sled causes the atherectomy burr rotatably secured to the distal end of the burr catheter to advance distally while sliding the advancer housing in a second, opposite, direction relative to the sled causes the atherectomy burr rotatably secured to the distal end of the burr catheter to withdraw proximally.

Alternatively or additionally, the advancer assembly may further include an advancer housing with the gearing moveably disposed within the advancer housing and a slider knob extending from the advancer housing and operably coupled with the gearing such that moving the slider knob in a first direction relative to the advancer housing causes the gearing and thus the burr catheter to advance distally while moving the slider knob in a second, opposite, direction relative to the advancer housing causes the gearing and thus the burr catheter to withdraw proximally.

Alternatively or additionally, the flexible drive cable may be fixed relative to the gearing.

Alternatively or additionally, the advancer housing may be adapted to accommodate a changing length of the flexible drive cable either between the drive assembly and the advancer assembly or within the advancer assembly as the gearing moves back and forth within the advancer housing.

In another example, an atherectomy system includes a drive assembly and an advancer assembly. The drive assembly includes a drive motor having an output shaft, a controller that is adapted to regulate operation of the drive motor and a flexible drive shaft that is adapted to be releasably securable to the output shaft. The advancer assembly includes an advancer housing and gearing disposed within the advancer housing that is configured to be coupled with the flexible drive shaft. The advancer assembly includes a sled to which the advancer housing is slidingly secured and a burr catheter that is coupled with and extends distally of the gearing. Sliding the advancer housing in a first direction relative to the sled causes the atherectomy burr rotatably secured to the distal end of the burr catheter to advance distally while sliding the advancer housing in a second, opposite, direction relative to the sled causes the atherectomy burr rotatably secured to the distal end of the burr catheter to withdraw proximally.

Alternatively or additionally, the advancer assembly may further include a brake assembly secured to the sled, the brake assembly adapted to releasably secure a guidewire extending through the burr catheter.

Alternatively or additionally, the advancer assembly may further include a saline source adapted to provide saline through the burr catheter.

Alternatively or additionally, the drive assembly may further include a user interface operably coupled with the controller.

In another example, an atherectomy system includes a drive assembly and an advancer assembly. The drive assembly includes a drive motor having an output shaft, a controller that is adapted to regulate operation of the drive motor and a flexible drive shaft that is adapted to be releasably securable to the output shaft of the drive motor. The advancer assembly includes an advancer housing, a gearbox that is slidingly disposed within the advancer housing and adapted to be operably coupled with the flexible drive shaft, a slider extending from the advancer housing and operably coupled with the gearing and a burr catheter coupled with and extending distally of the gearing. Moving the slider knob in a first direction relative to the advancer housing causes the gearbox and thus the burr catheter to advance distally while moving the slider knob in a second, opposite, direction relative to the advancer housing causes the gearbox and thus the burr catheter to withdraw proximally.

Alternatively or additionally, the flexible drive cable may be fixed relative to the gearbox.

Alternatively or additionally, the advancer housing may be adapted to accommodate a changing length of the flexible drive cable either between the drive assembly and the advancer assembly or within the advancer assembly as the gearbox moves back and forth within the advancer housing.

Alternatively or additionally, the advancer assembly may further include a brake assembly that is adapted to releasably secure a guidewire extending through the burr catheter.

Alternatively or additionally, the drive assembly may further include a user interface operably coupled with the controller.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 9A through 9C are schematic block diagrams of an illustrative atherectomy system;

Figure 1:
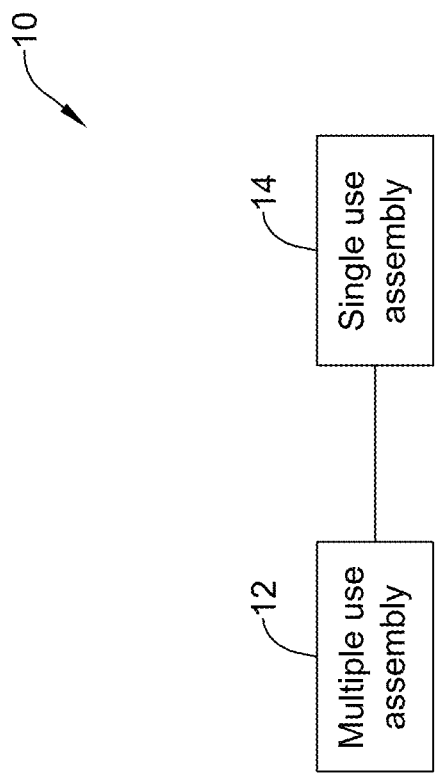
FIG. 1 is a schematic block diagram of an illustrative atherectomy system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The drawings, which are not necessarily to scale, depict illustrative embodiments and are not intended to limit the scope of the invention.

Cardiovascular disease and peripheral arterial disease may arise from accumulation of atheromatous material on the inner walls of vascular lumens, resulting in a condition known as atherosclerosis. Atheromatous and other vascular deposits may restrict blood flow and can cause ischemia in a heart of a patient, vasculature of a patient's legs, a patient's carotid artery, etc. Such ischemia may lead to pain, swelling, wounds that will not heal, amputation, stroke, myocardial infarction, and/or other conditions.

Atheromatous deposits may have widely varying properties, with some deposits being relatively soft and others being fibrous and/or calcified. In the latter case, the deposits may be referred to as plaque. Atherosclerosis occurs naturally as a result of aging, but may also be aggravated by factors such as diet, hypertension, heredity, vascular injury, and the like. Atherosclerosis may be treated in a variety of ways, including drugs, bypass surgery, and/or a variety of catheter-based approaches that may rely on intravascular widening or removal of the atheromatous or other material occluding the blood vessel. Atherectomy is a catheter-based intervention that may be used to treat atherosclerosis.

Atherectomy is an interventional medical procedure performed to restore blood flow through a portion of a patient's vasculature that has been blocked by plaque or other material (e.g., blocked by an occlusion). In an atherectomy procedure, a device on an end of a drive shaft that is used to engage and/or remove (e.g., abrade, grind, cut, shave, etc.) plaque or other material from a patient's vessel (e.g., artery or vein). In some cases, the device on an end of the drive shaft may be abrasive and/or may otherwise be configured to remove plaque from a vessel wall or other obstruction in a vessel when the device is rotating and engages the plaque or other obstruction. In some cases, atherectomy involves using an abrasive atherectomy burr that is rotated at high speeds exceeding 100,000 revolutions per minute (RPM) in order to abrade plaque and other hardened materials from within the patient's vessel. Atherectomy burrs may be rotated at speeds exceeding 140,000 RPM, at speeds exceeding 180,000 RPM and even at speeds as high as 220,000 RPM.

FIG. 1 is a schematic block diagram of an illustrative atherectomy system 10. In some cases, the atherectomy system 10 may be considered as including a multiple use assembly 12 and a single use assembly 14. In some instances, the multiple use assembly 12 may be considered as something that will remain out of the sterile field when the atherectomy system 10 is in use while the single use assembly 14 may be considered as being deployed within the sterile field while the atherectomy system 10 is in use. In some cases, the multiple use assembly 12 may be adapted to be sterilized after use, thereby allowing reuse of the multiple use assembly 12. In some cases, the multiple use assembly 12 may be bagged or otherwise separated from the sterile field, and thus in some instances may be deployed at least partially within the sterile field, for example.

As will be discussed, the multiple use assembly 12 may include some of the more expensive components such as a drive motor and the electronics necessary to control operation of the drive motor. The multiple use assembly 12 may include a user interface, for example. The multiple use assembly 12 may be considered as being intended to be used over and over again. Being able to use the multiple use assembly 12 a plurality of times can provide cost savings. Because the multiple use assembly 12 is sealed against contaminants, a plurality of single use assemblies 14 may be used with the multiple use assembly 12, one after the other.

As an example, a particular single use assembly 14 may include a burr having a particular diameter, and an operator may discover in the middle of an atherectomy procedure that the burr is either too small or too large. The operator may withdraw the burr catheter of that particular single use assembly 14 from the patient's vasculature and that particular burr catheter may be replaced or that single use assembly 14 may be thrown away, and a new single use assembly 14 having a burr of more appropriate diameter may be coupled with the multiple use assembly 12 and the atherectomy procedure may continue. It will be appreciated that this is merely illustrative, as there are any variety of reasons to change to a different single use assembly 14 during an atherectomy procedure.

In some cases, for example, a first single use assembly 14 may be used for a first patient and then disposed of, and a second single use assembly 14 may be used for an atherectomy procedure performed on a second patient. One way to consider the illustrative atherectomy system 10 is that the multiple use assembly 12, may be considered as the "dry" part of the atherectomy system 10. Conversely, the single use assembly 14 may be considered as the "wet" part of the atherectomy system 10. The single use assembly 14 may, for example, include saline that is provided within a drive shaft. There is no fluid transfer between the "wet" part of the atherectomy system 10 and the "dry" part of the atherectomy system 10. Moreover, it will be appreciated that the "dry" part of the atherectomy system 10, may be re-sterilized and re-used with a subsequent patient. This can provide cost savings, as the components within the "dry" part don't have to be replaced with each atherectomy process.

The multiple use assembly 12 may be sterilized and subsequently re-sterilized after use, via any of a variety of different sterilization processes. For example, the multiple use assembly 12 may be wiped down with isopropyl alcohol wipes or exposed to an ethylene oxide atmosphere in order to sterilize the multiple use assembly 12. It will be appreciated that it is only necessary to sterilize the outer surfaces of the multiple use assembly 12. In some instances, the multiple use assembly 12 may be subjected to a radiative sterilization process such as E-beam radiation or gamma radiation. In some cases, steam sterilization may be used. It will be appreciated that these examples are merely illustrative, and other types of sterilization are contemplated.

As will be discussed, the atherectomy system 10 may utilize any of a variety of different coupling mechanisms to operably couple the multiple use assembly 12 and the single use assembly 14. In some cases, any coupling mechanism that allows a rotatable yet releasable connection between the multiple use assembly 12 and the single use assembly 14 may be used. In this, it will be appreciated that the coupling mechanism rotatably couples a drive motor output that is part of the multiple use assembly 12 to a flexible drive cable that extends from the drive motor output to corresponding gearing within the single use assembly 14, as will be discussed. In some instances, the flexible drive cable may be considered as being part of the single use assembly 14. In some instances, the flexible drive cable may be considered as distinct from the single use assembly 14, although the flexible drive cable may generally be treated as being single-use only. In some cases, there may be a similar coupling mechanism at the opposite end of the flexible drive cable, between the flexible drive cable and the gearing within the single use assembly 14. In some cases, the coupling may be adapted to permit fluid flow from the multiple use assembly into and through the flexible drive cable and thus into and through the single use assembly 14.

The coupling mechanism may include bevel gears. In some cases, the coupling mechanism may include a splined connection. In some cases, cone gears may be used, such as a female cone gear on either the multiple use assembly 12 or the single use assembly 14, and a male cone gear on the other of the multiple use assembly 12 or the single use assembly 14. In some cases, a friction or clamping fit such as a taper fixture may be used.

In some instances, a keyed coupling mechanism may be used. As an example, the drive motor output may include an aperture of a particular shape and the flexible drive cable to be coupled with the drive motor output may include a protrusion that is complementary to the shape of the aperture such that the protrusion fits into the aperture and is prevented by the shape from rotating relative to the aperture. Alternatively, the drive motor output may include a protrusion of a particular shape while the flexible drive cable to be coupled with the drive motor output may include a corresponding aperture. Any of a variety of different shapes may be used, such as triangular, square, star, elliptical, pentagonal, hexagonal, octagonal and the like.

In some cases, a magnetic coupling may be used. An illustrative but non-limiting example of a suitable magnetic coupling may be found in U.S. 63/106,164 filed Oct. 27, 2020 under the title "MAGNETICALLY DRIVEN ATHERECTOMY SYSTEM", which application is hereby incorporated by reference in its entirety. It will be appreciated that a magnetic coupling may be magnetic or electromagnetic.

Figure 2:
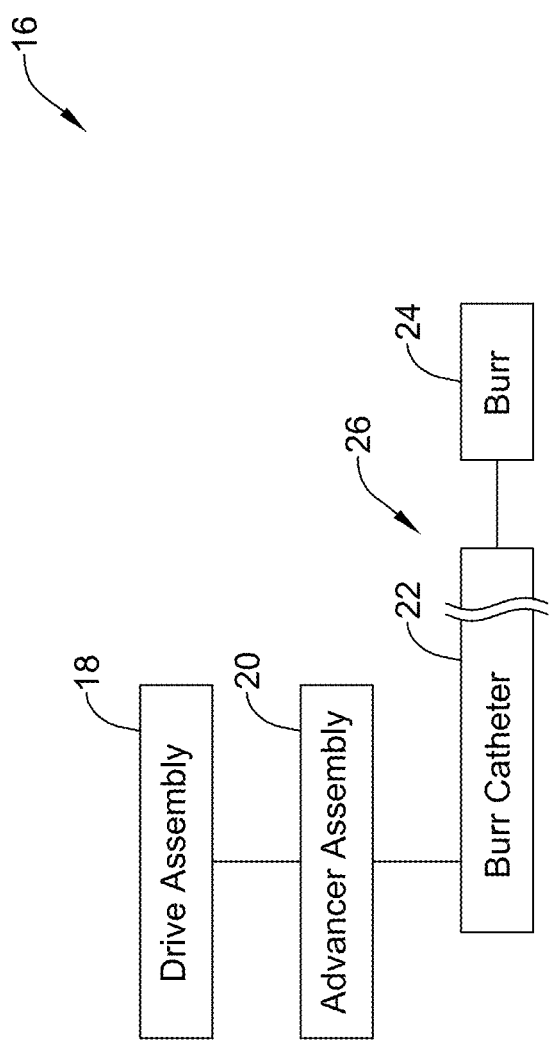
FIG. 2 is a schematic block diagram of an illustrative atherectomy system.

FIG. 2 is a schematic block diagram of an illustrative atherectomy system 16. The atherectomy system 16 may be considered as being an example of the atherectomy system 10 that is shown in FIG. 1. The atherectomy system 16 includes a drive assembly 18 and an advancer assembly 20. Details of the drive assembly 18 are discussed with respect to FIG. 3 and details of the advancer assembly 20 are discussed with respect to FIG. 4.

In some cases, the drive assembly 18 may be considered as being an example of the multiple use assembly 12 while the advancer assembly 20 may be considered as being an example of the single use assembly 14. This means that the drive assembly 18 may be used multiple times, in a plurality of procedures, while the advancer assembly 20 may only be used one time, with one patient. Accordingly, the drive assembly 18 may include any of the elements and features discussed with respect to the multiple use assembly 12, and vice versa. Similarly, the advancer assembly 20 may include any of the elements and features discussed with respect to the single use assembly 14, and vice versa. A burr catheter 22 extends from the advancer assembly 20 and includes a burr 24 that is secured to a distal end 26 of the burr catheter 22. In some cases, the advancer assembly 20 may be configured to enable relative translation of the burr catheter 22 in order to advance and withdraw the atherectomy burr 24 fixed to the distal end 26 of the burr catheter 22.

Figure 3:
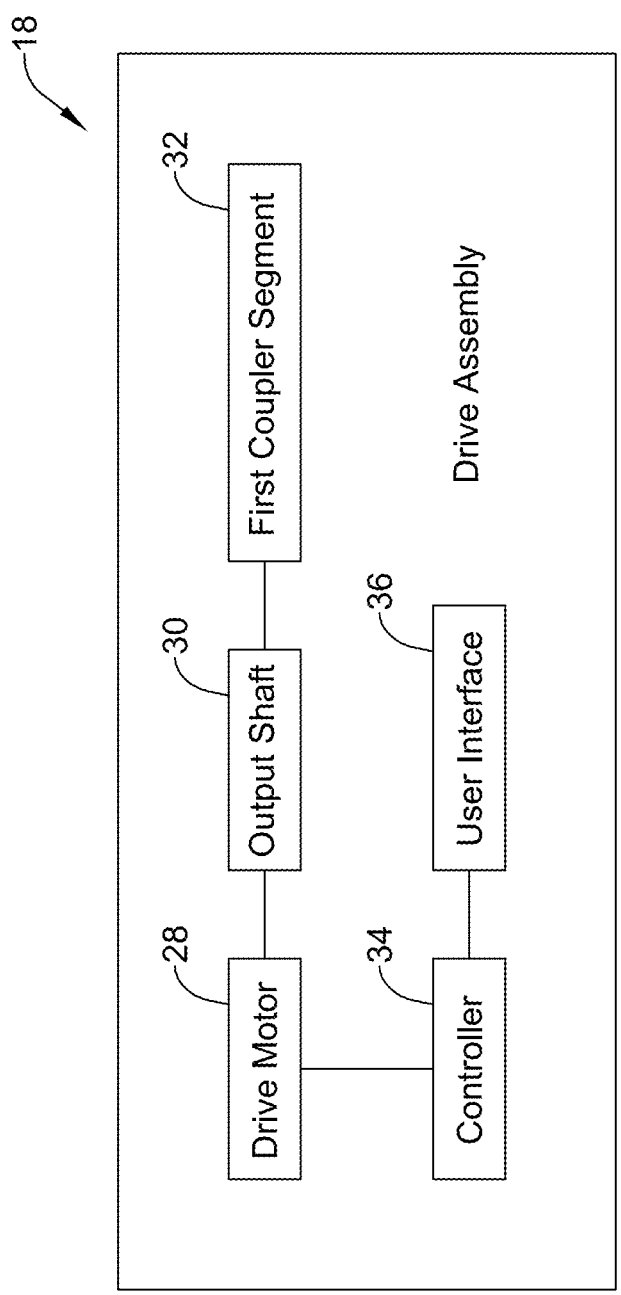
FIG. 3 is a schematic block diagram of an illustrative drive assembly.

FIG. 3 is a schematic block diagram of the drive assembly 18. The drive assembly 18 includes a drive motor 28 that is adapted to drive an output shaft 30. As the drive motor 28 operates, the output shaft 30 is driven into rotation. While not illustrated, in some cases there may be one or more gears between the drive motor 28 and the output shaft 30 in order to increase or decrease the rotational speed of the output shaft 30 relative to a rotational speed of the drive motor 28 itself. The drive motor 28 may be any of a variety of different types of electric motors. In some cases, the drive motor 28 may not be an electric motor, but may instead be a pneumatically driven turbine. A first coupler segment 32 is operably coupled with the output shaft 30. The first coupler segment 32 may cooperate with a second coupler segment (not shown in FIG. 3) that is disposed at one end of a flexible drive cable, and may include any of the coupler mechanisms discussed.

In some cases, particularly if the drive motor 28 is an electric motor, the drive assembly 18 includes a controller 34 that is adapted to regulate operation of the drive motor 28. In some cases, the controller 34 may implement Proportional, Integral Derivative (PID) control over the drive motor 28. While not illustrated, the drive assembly 18 may include one or more sensors that provide feedback to the controller 34 as to the operation of the drive motor 28. The controller 34 may monitor torque being applied to the atherectomy burr 24, for example, and may shut down, reverse or take other appropriate actions in response to detecting a torque increase or speed decrease that could indicate an impending stall, for example. In some cases, the controller 34 may utilize phase delay compensation.

In some cases, the drive assembly 18 may include a user interface 36 that is controlled by the controller 34. The user interface 36 may display relevant information for the user of the atherectomy system 16, such as a rotational speed of the atherectomy burr 24. The user interface 36 may display other information as well. In some cases, the user interface 36 enables the user to enter pertinent information for use by the controller 34 in controlling operation of the drive motor 28 and ultimately the performance of the atherectomy burr 24.

Figure 4:
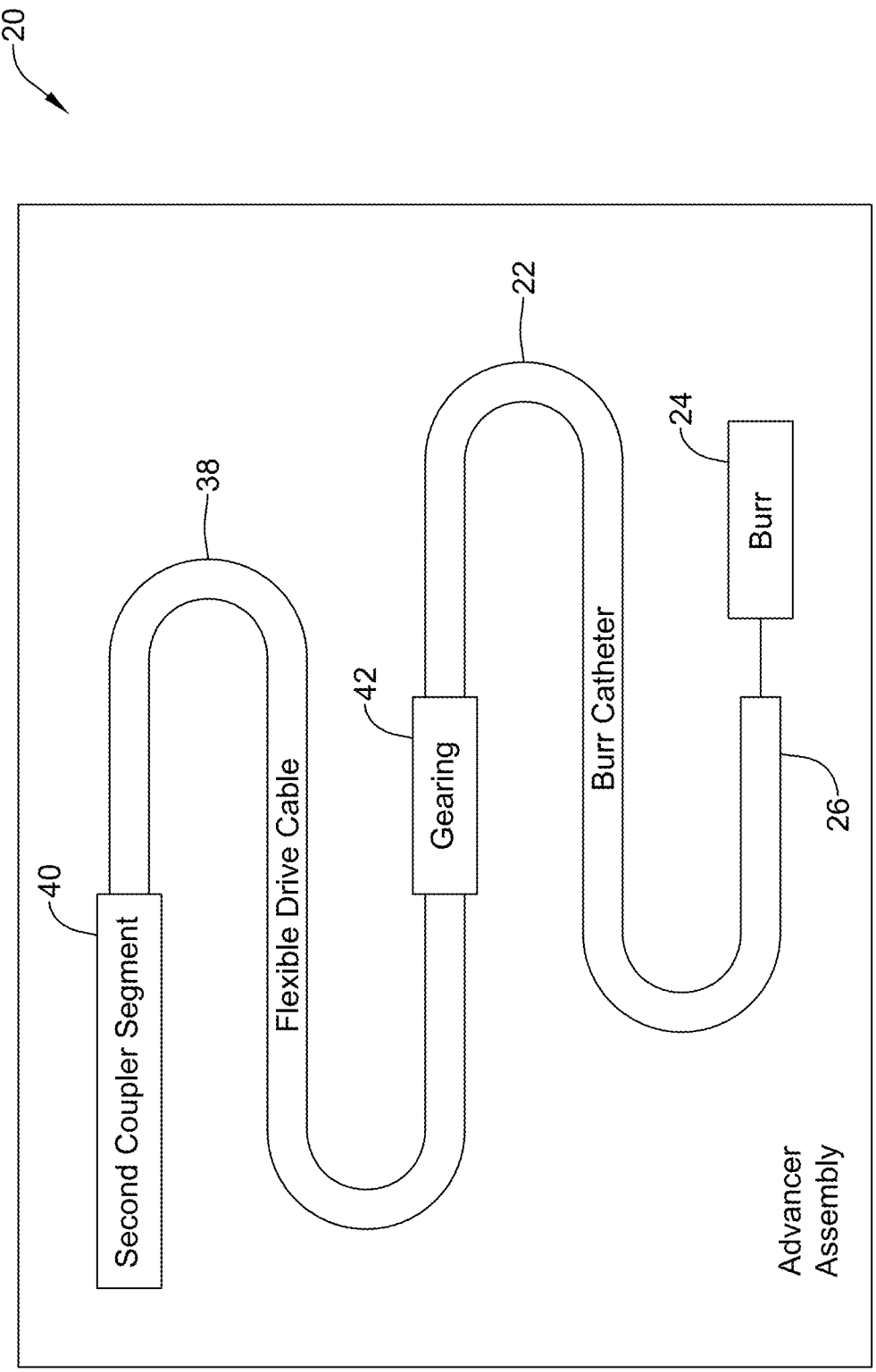
FIG. 4 is a schematic block diagram of an illustrative advancer assembly.

FIG. 4 is a schematic block diagram of the advancer assembly 20. As illustrated, the advancer assembly 20 includes a flexible drive cable 38. In some instances, the flexible drive cable 38, while still being a single-use item, may be considered as being distinct from the advancer assembly 20. Alternatively, the flexible drive cable 38 may be part of the multiple use assembly 12. The flexible drive cable 38 may be considered as being adapted to be releasably securable to the first coupler segment 32 (FIG. 3) of the drive assembly 18. In some cases, the flexible drive cable 38 may include a second coupler segment 40 that is adapted to be complementary to the first coupler segment 32. The first coupler segment 32 and the second coupler segment 40 may in combination form a handshake connection, for example.

The flexible drive cable 38 extends to a gearing 42 that is disposed within the advancer assembly 20. In some cases, the flexible drive cable 38 is coupled with the gearing 42 during manufacture. In some instances, the flexible drive cable 38 is adapted to be releasably secured relative to the gearing 42 in the field. In such cases, the flexible drive cable 38 and the gearing 42 may together form another complementary coupling mechanism that enables the flexible drive cable 38 to be releasably secured relative to the gearing 42. The burr catheter 22 is operably coupled to the gearing 42 such that rotation of the flexible drive cable drives the gearing 42 into rotation and thus drives the burr catheter 22 into rotation.

Figure 5:
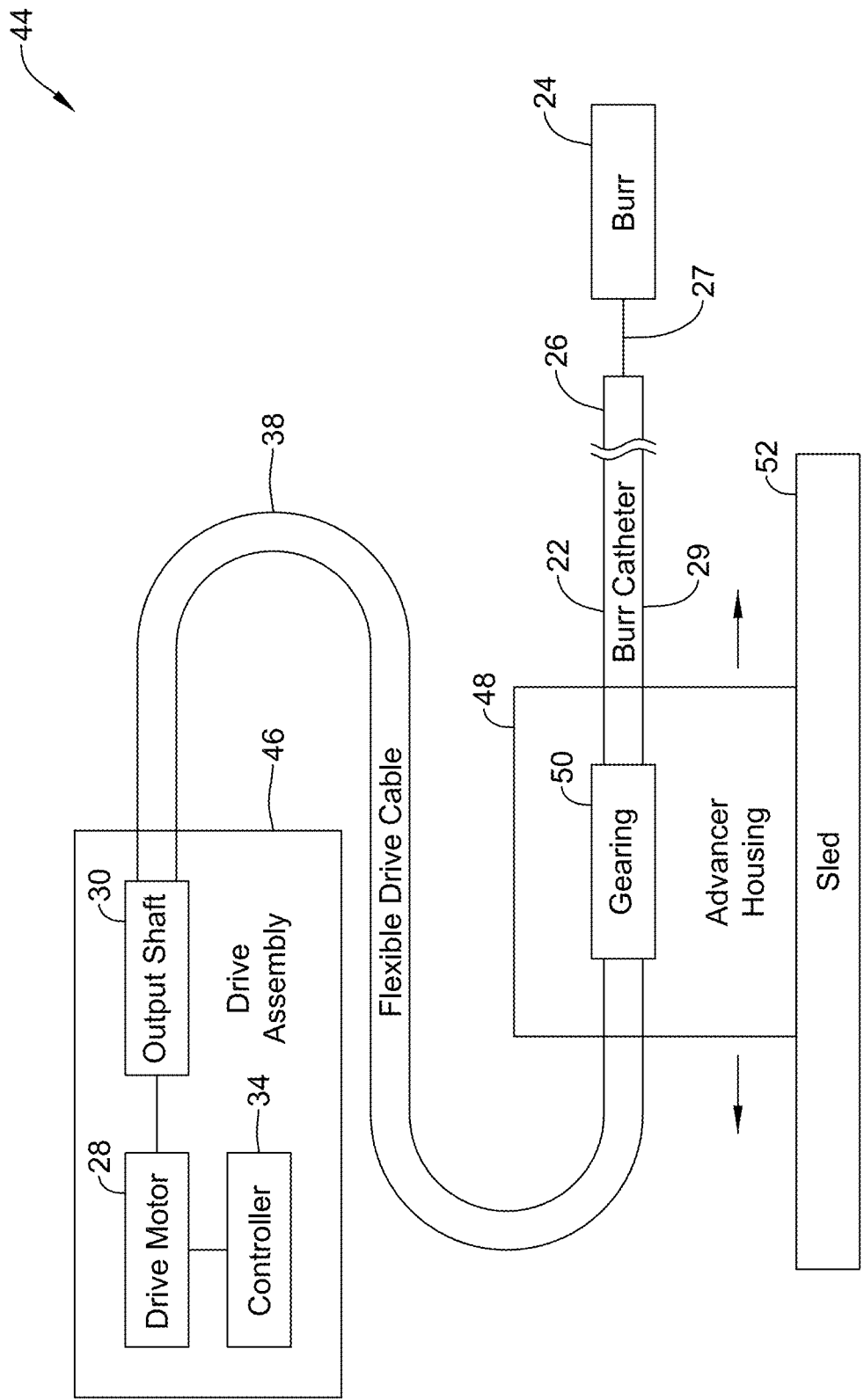
FIG. 5 is a schematic block diagram of an illustrative atherectomy system.

FIG. 5 is a schematic block diagram of an illustrative atherectomy system 44. The atherectomy system 44 may be considered as being an example of the atherectomy system 10 or the atherectomy system 16. The atherectomy system 44 includes a drive assembly 46 that includes the drive motor 28, the output shaft 30 and the controller 34. In some cases, the atherectomy system 44 may include a drive assembly such as the drive assembly 18 as seen in FIG. 3. The flexible drive cable 38 extends from the drive assembly 46 to an advancer housing 48 and is operably coupled with gearing 50 that is disposed within the advancer housing 48. In some cases, the flexible drive cable 38 and the burr catheter 22 may be preinstalled as an assembly with the advancer housing 48 and hence the gearing 50. In some cases, one or both of the flexible drive cable 38 and the burr catheter 22 may instead be separate from the advancer housing 48, and one or both of the flexible drive cable 38 and the burr catheter 22 may instead form complementary couplings with the advancer housing 48 and/or the gearing 50. The burr catheter 22 may be seen as including a drive coil 27 extending through an outer sheath 29.

In this example, the gearing 50 and the burr catheter 22, including the drive coil 27 and the outer sheath 29, are secured in place within the advancer housing 48, and do not move relative to the advancer housing 48. Therefore, the burr 24 and the drive coil 27 do not move relative to the outer sheath 29. Rather, the advancer housing 48 itself translates left and right (in the illustrated orientation) relative to a sled 52 and the burr catheter including both the drive coil 27 and the outer sheath 29 as well as the burr 24 translates left and right in response. The sled 52 may be adapted to be secured to a work surface, for example, in order to make it easier to control relative motion between the advancer housing 48 and the sled 52.

Accordingly, moving the advancer housing 48 to the right (as illustrated) relative to the sled 52 causes the burr catheter 22 (and hence the atherectomy burr 24) to move to the right. Moving the advancer housing 48 to the left (as illustrated) relative to the sled 52 causes the burr catheter 22 (and hence the atherectomy burr 24) to move to the left. Put another way, sliding the advancer housing 48 in a first direction relative to the sled 52 causes the atherectomy burr 24 rotatably secured to the distal end 26 of the burr catheter 24 to advance distally while sliding the advancer housing 48 in a second, opposite, direction relative to the sled 52 causes the atherectomy burr 24 rotatably secured to the distal end 26 of the burr catheter 22 to withdraw proximally.

Figure 6:
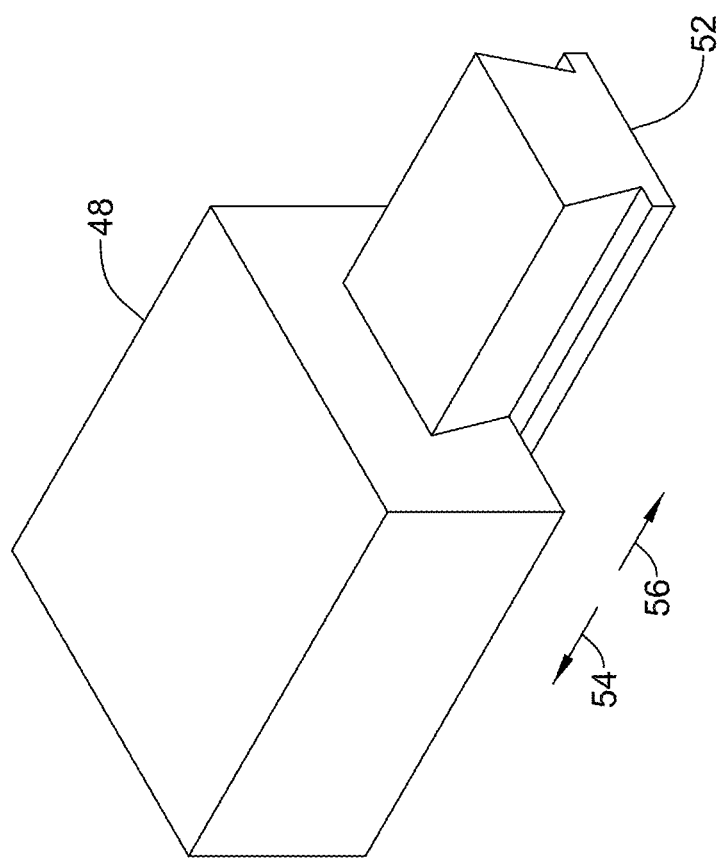
FIG. 6 is a perspective view of a portion of the illustrative atherectomy system of FIG. 5.

In some cases, there may be a keyed relationship between the advancer housing 48 and the sled 52. FIG. 6 provides a highly schematic look at a possible relationship between the advancer housing 48 and the sled 52. In this example, it can be seen that there is a keyed relationship between the advancer housing 48 and the sled 52 that allows translation of the advancer housing 48 relative to the sled 52 in a predefined first direction and an opposing, predefined second direction while preventing any other relative motion. While a particular keyed relationship is illustrated, it will be appreciated that other keyed relationships are also contemplated. The sled 52 may include tracks that the advancer housing 48 fits into, for example.

For example, the advancer housing 48 may be moved relative to the sled 52 in a direction indicated by an arrow 54 and in an opposite direction indicated by an arrow 56. However, the advancer housing 48 is prevented from moving in any other direction, such as a direction orthogonal to that indicated by the arrow 54 or the arrow 56. If the arrows 54 and 56 are considered as being aligned along the X direction in an orthogonal coordinate system, it will be appreciated that no or substantially no relative movement between the advancer housing 48 and the sled 52 is permitted in the Y direction or the Z direction, for example.

Figure 7:
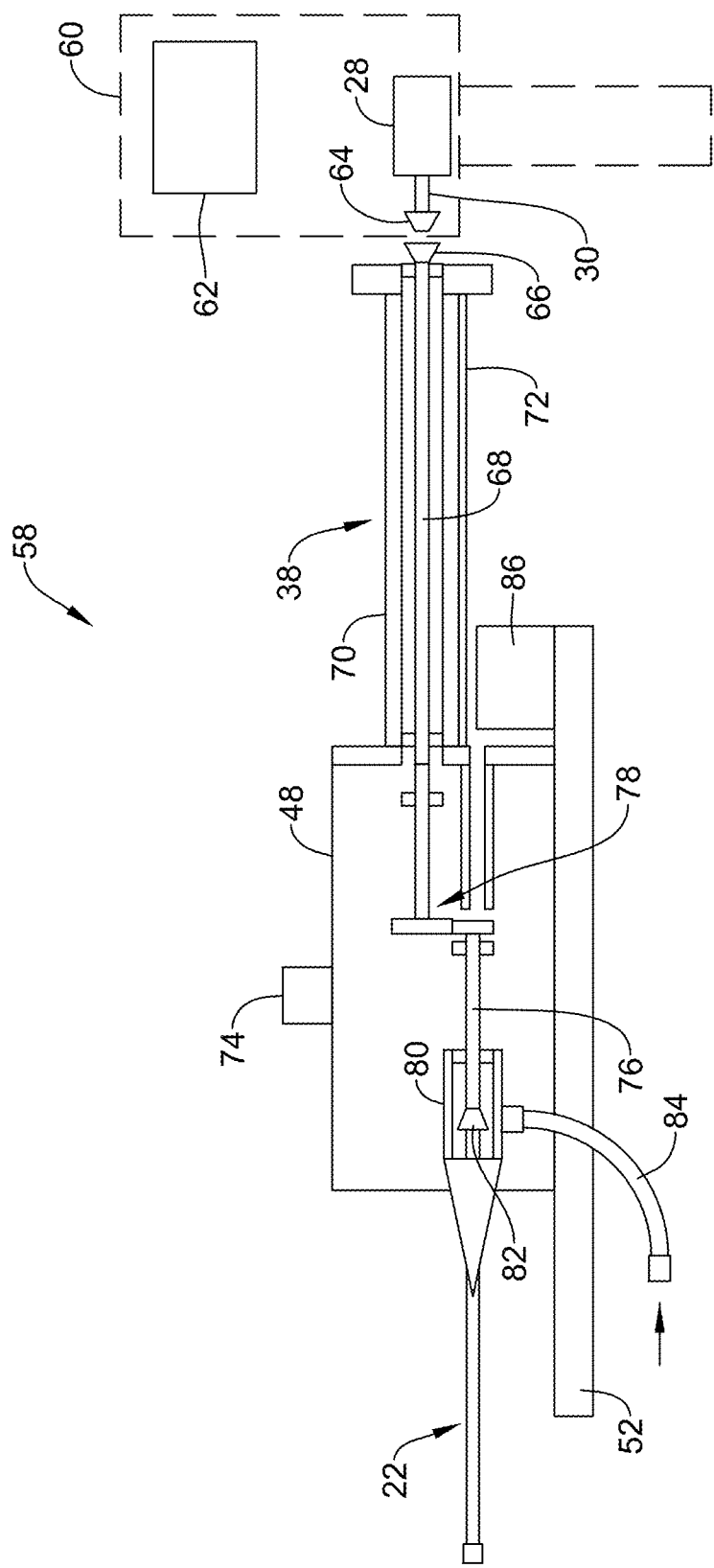
FIG. 7 is a schematic diagram of an illustrative atherectomy system.

FIG. 7 is a schematic diagram of an illustrative atherectomy system 58. The atherectomy system 58 may be considered as being an example of the atherectomy system 10, the atherectomy system 16 or the atherectomy system 44. The atherectomy system 58 includes a drive assembly 60 that includes the drive motor 28 and various electronics 62 that may include both a user interface (such as the user interface 36 shown in FIG. 3) and circuitry that provides the functionality of the controller 34. In this particular example, a male cone gear 64 can be seen as being operably coupled with the output shaft 30 of the drive motor 28. The flexible drive cable 38 includes at a proximal end thereof a female cone gear 66 that is adapted to cooperate with the male cone gear 64 such that rotation of the male cone gear 64 drives the female cone gear 66 into rotation. It can be seen that the flexible drive cable 38 includes a drive coil 68 that is disposed within a flexible outer sheath 70. The flexible drive coil 68 is driven into rotation by rotation of the female cone gear 66. The flexible drive cable 38 may include electrical and saline connections 72.

The advancer housing 48 includes an activation button 74 that may be used to turn the atherectomy system 58 on and off. There is no slide knob, as the advancer housing 48 itself is translated relative to the sled 52 in order to effect translation of the burr catheter 22. A drive shaft 76, which extends through the burr catheter 22 in order to rotate the atherectomy burr 24, is driven into rotation by a set of gears 78. In some cases, a pump house 80 including a pump rotor 82 that is secured to the drive shaft 76 causes saline that is provided via a saline path 84 to be pumped into and through an interior of the burr catheter 22.

A guidewire brake 86 is secured relative to the sled 52. A guidewire (not shown here but included in FIG. 9) is advanced through the patient's vasculature to and beyond the position of a treatment site such as a lesion, and the burr catheter 22 is subsequently guided into position over the guidewire. The brake assembly 86 prevents movement of the guidewire, including translation of the guidewire and/or rotation of the guidewire, while the atherectomy system 58 is operating. A variety of different types of brake assemblies are contemplated. For example, the brake assembly 86 may rely at least in part upon mechanical impingement, using one or more of a lever, a multi bar linkage, a cam, a pinch, a collet, a wedge or a slide. Activation of the brake assembly 86 may be pneumatic, manual, electromechanical or via a solenoid, for example.

Figure 8A:
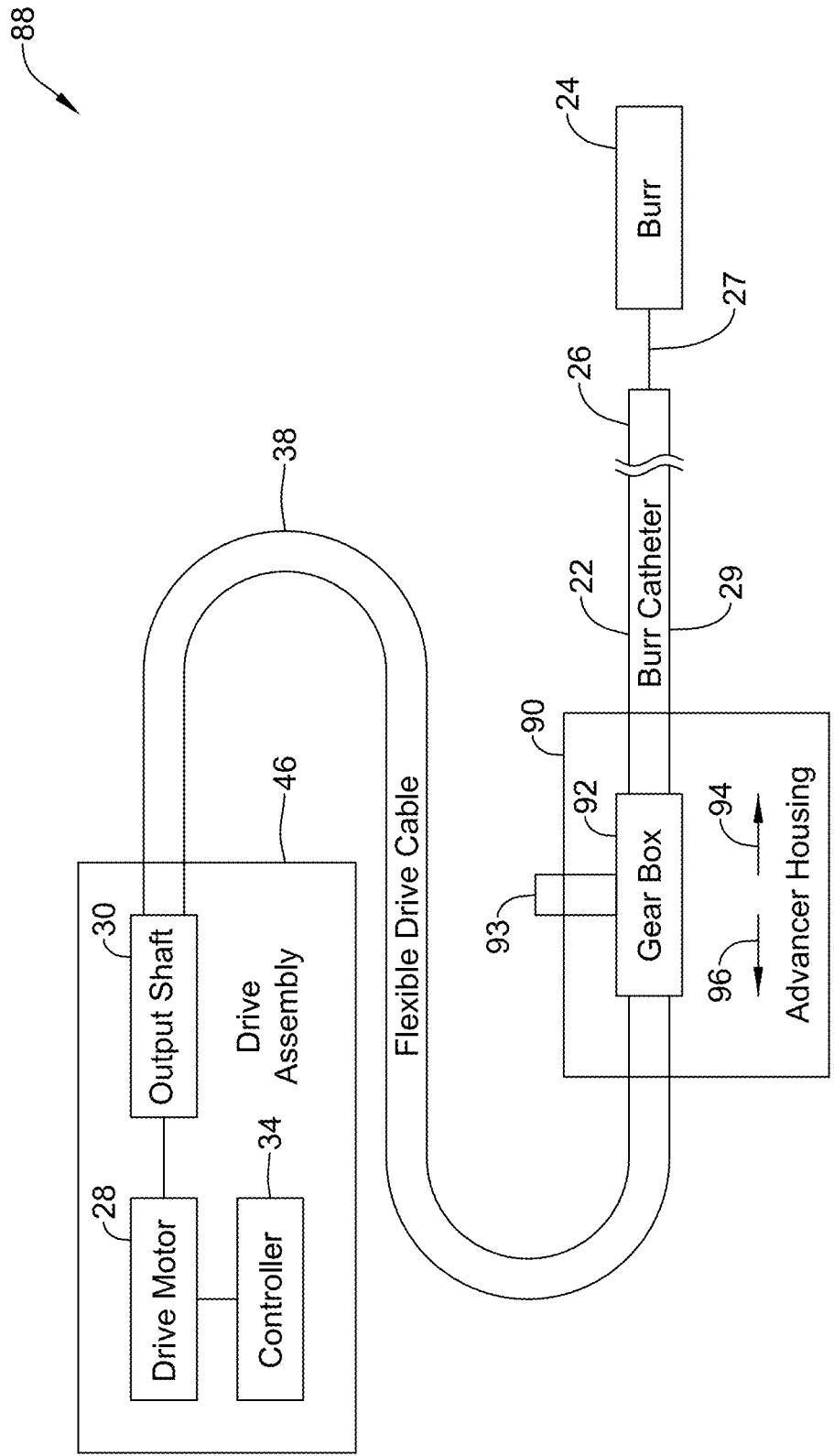
FIG. 8A through 8C are schematic block diagrams of an illustrative atherectomy system.
Figure 8B:
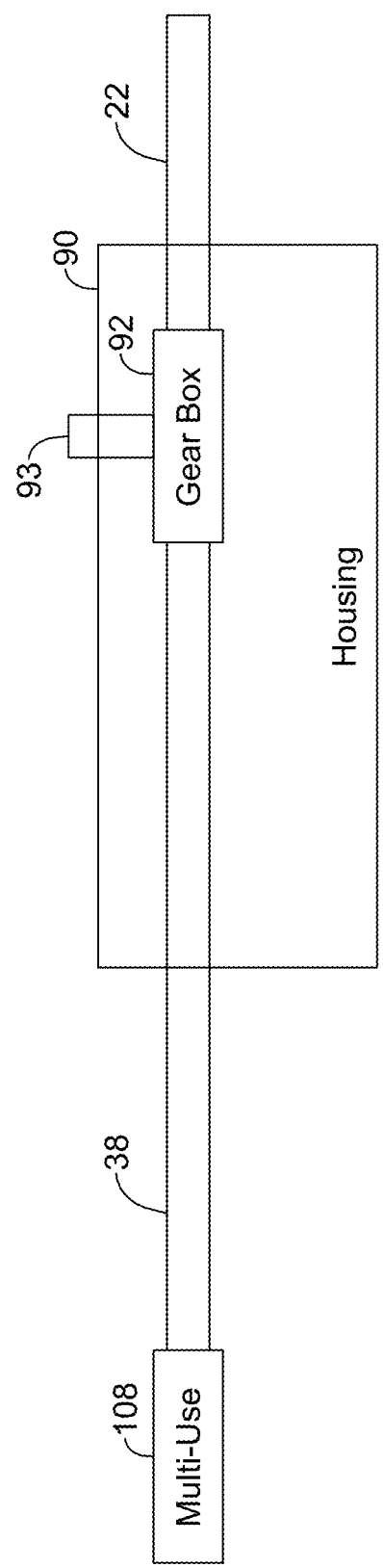
Figure 8C:
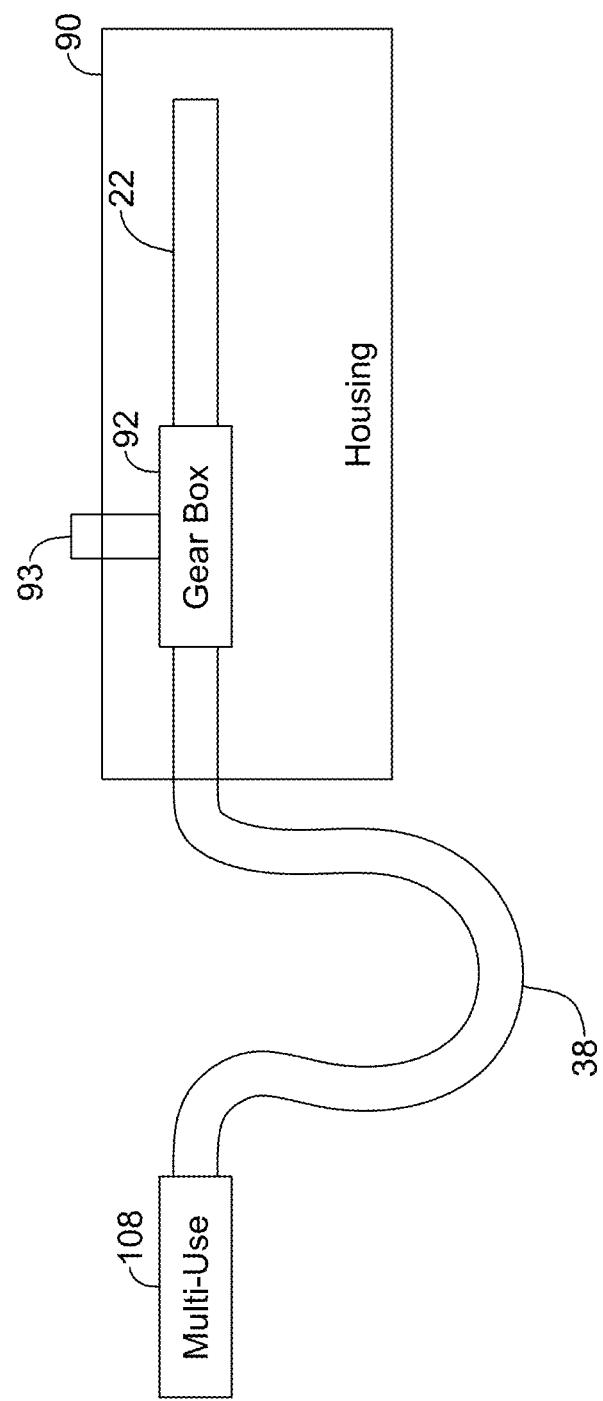

FIGS. 8A-8C are schematic block diagrams of an illustrative atherectomy system 88. The atherectomy system 88 may be considered as being an example of the atherectomy system 10 or the atherectomy system 16. The atherectomy system 88 includes the drive assembly 46 and the flexible drive shaft 38. In some cases, the atherectomy system 88 may include a drive assembly such as the drive assembly 18 as seen in FIG. 3. An advancer housing 90 includes a gear box 92 that is slidingly disposed within the advancer housing 90. The gear box 92 is operably coupled with the flexible drive cable 38 and the burr catheter 22. In some cases, the gear box 92 may be translated left and right (in the illustrated orientation) relative to the advancer housing 90 by grasping a slider knob 93 that extends out of the advancer housing 90. Moving the slider knob 93 in a first direction indicated by an arrow 94 causes the gear box 92 and thus the burr catheter 22 to advance distally while moving the slider knob 93 in a second, opposite, direction indicated by an arrow 96 causes the gear box 92 and thus the burr catheter 22 to withdraw proximally. Moving the slider knob 93 is the first direction, as shown for example in FIG. 8B, results in slack being taken up in the flexible drive shaft 38. Conversely, moving the slider knob 93 in the second direction, as shown for example in FIG. 8C, results in increasing the slack in the flexible drive shaft 38. In some cases, an effective distance between the drive assembly 46 and the advancer housing 90 increases and decreases as the slider knob 93 is moved in either direction. In some cases, the drive coil 27 is fixed relative to the gear box 92 but the outer sheath 29 is not, meaning that the relative position of the burr 24 moves relative to the outer sheath 29 as the slider knob 93 is moved in either direction.

Figure 9A:
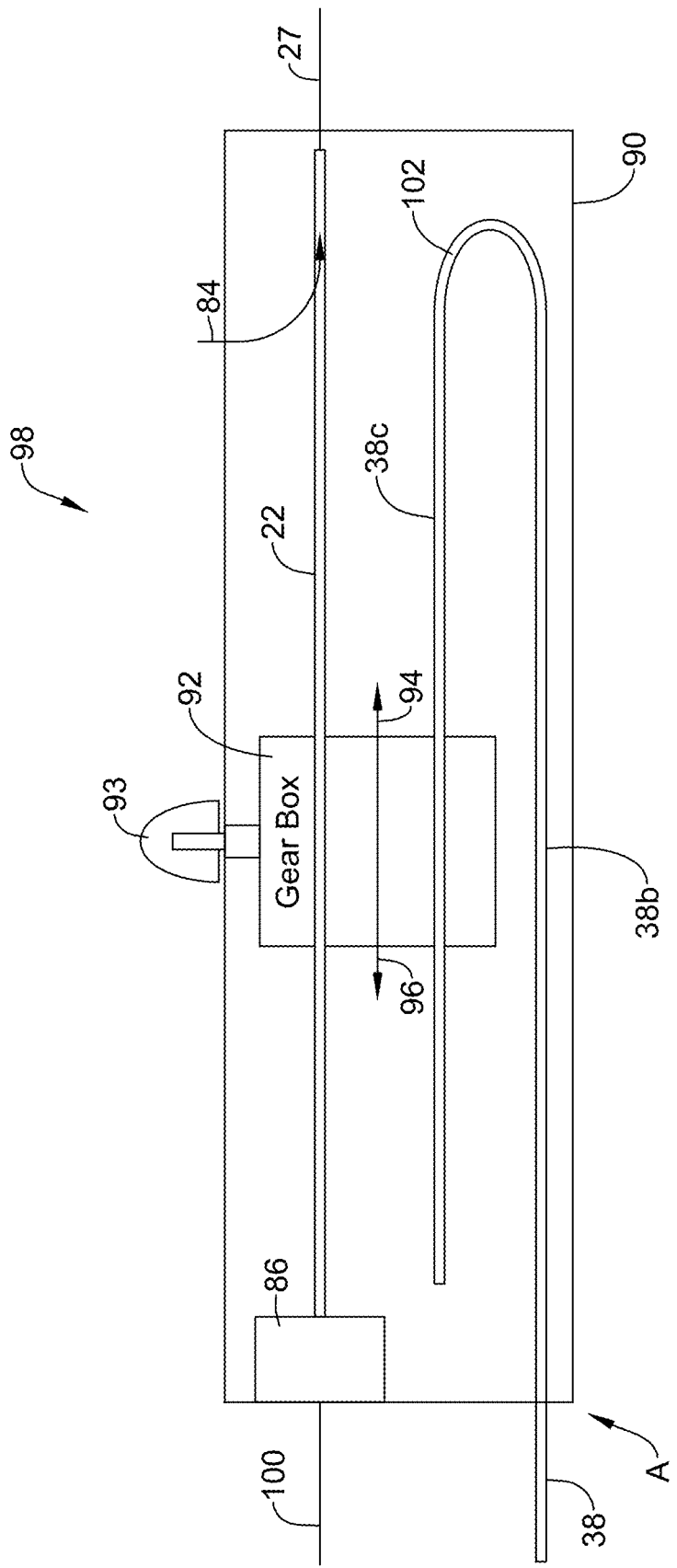
Figure 9C:
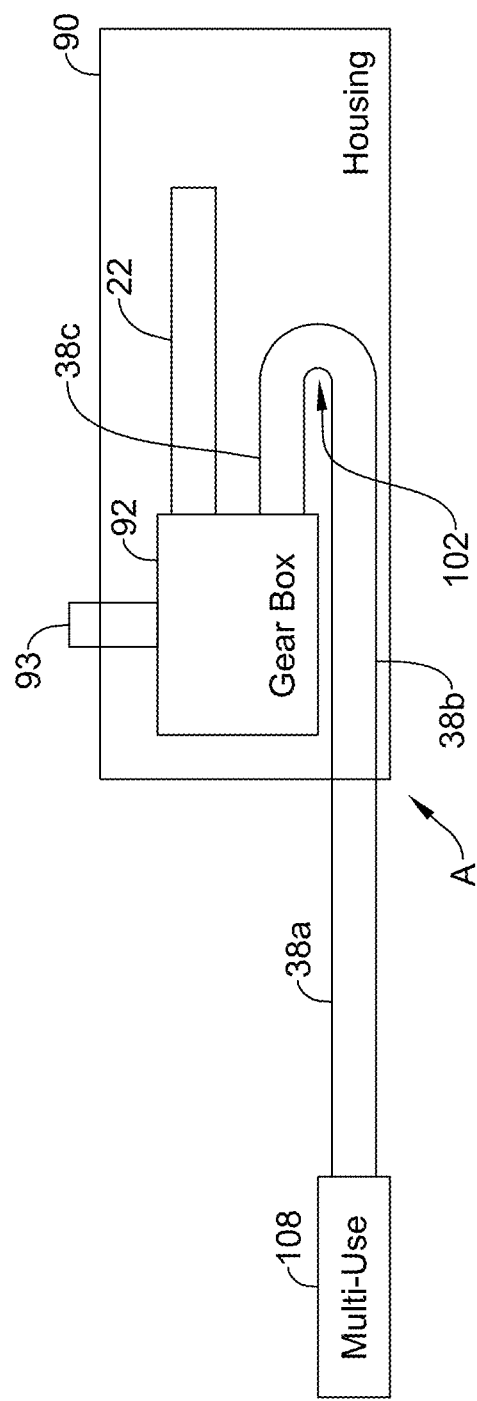

FIGS. 9A-9C are schematic block diagrams of an illustrative atherectomy system 98. The atherectomy system 98 may be considered as being an example of the atherectomy system 88. It will be appreciated that features ascribed to one of the atherectomy system 88 and the atherectomy system 98 may apply equally to the other of the atherectomy system 88 and the atherectomy system 98. A guidewire 100 can be seen as extending through the brake assembly 86, through the gear box 92 and into the burr catheter 22. In this example, the brake assembly 86 is located within the advancer housing 90, although this is not required in all cases. The flexible drive cable 38 may be considered as being fixed relative to the gear box 92. The atherectomy system 98 includes a cable carrier 102 that is adapted to accommodate the change in position of the flexible drive cable 38 as the gear box 92 slides back and forth within the advancer housing 90.

As seen for example in FIGS. 9B and 9C, the flexible drive cable 38 includes a fixed length portion 38a, which extends from the console 108 (multiple use) to where the flexible drive cable 38 is fixed to the housing 90 at point A, a length 38b, which is the length of the flexible drive cable 38 between the fixed length portion 38a and the cable carrier 102, and a length 38c, which is the length of the flexible drive cable 38 between the cable carrier 102 and the gear box 92. When the gear box 92 is moved to the right, the radius in the cable carrier 102 remains constant and moves to the right, causing a length 38b of the flexible drive cable 38 to lengthen and a length 38c of the flexible drive cable 38 to shorten. When the gear box 92 is moved to the left, the radius in the cable carrier 102 remains constant and moves to the left, causing the length 38b of the flexible drive cable 38 to shorten and the length 38c of the flexible drive cable 38 to lengthen.

Figure 9D:
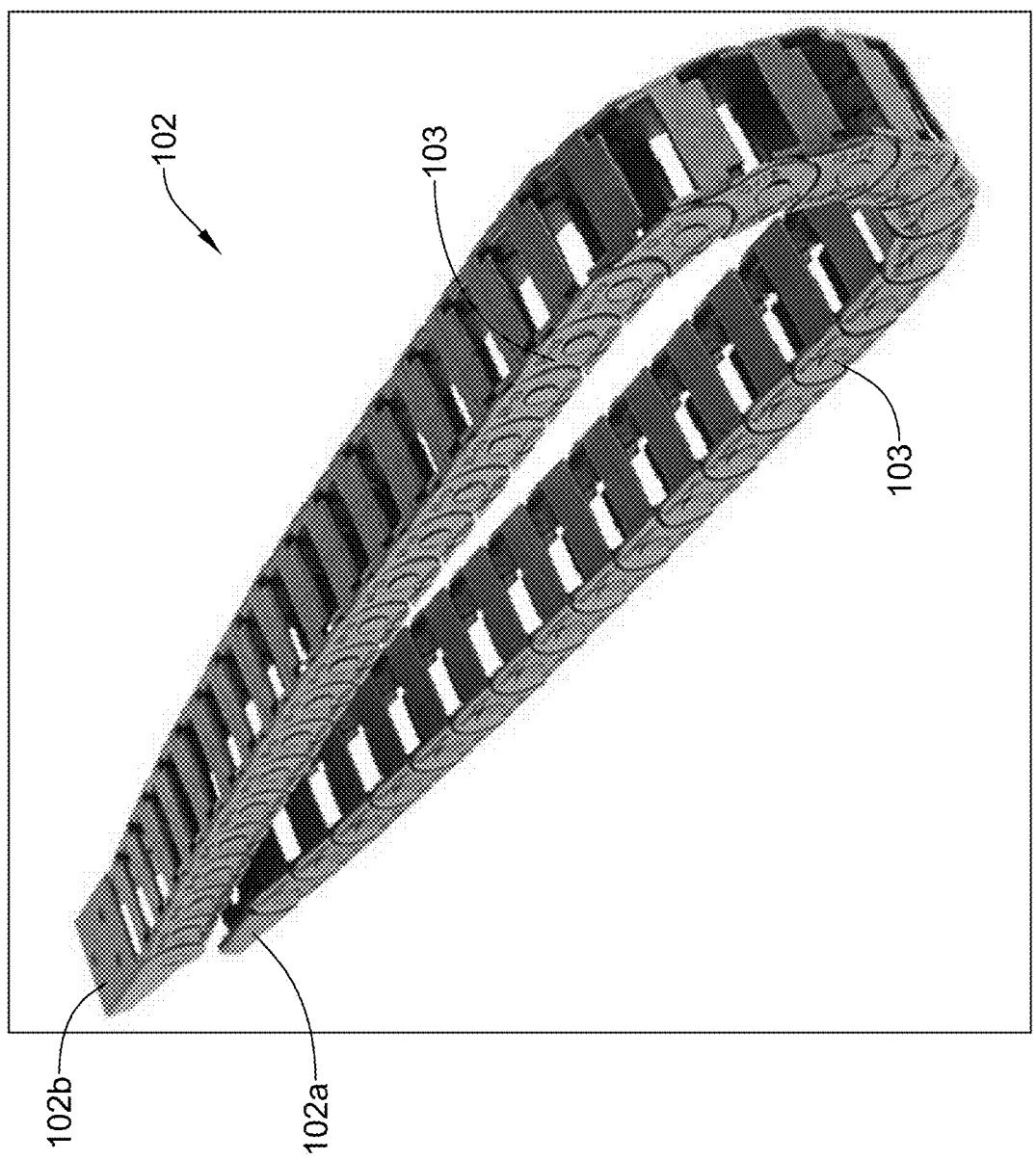
FIG. 9D is a perspective view of an illustrative cable carrier.
Figure 9E:
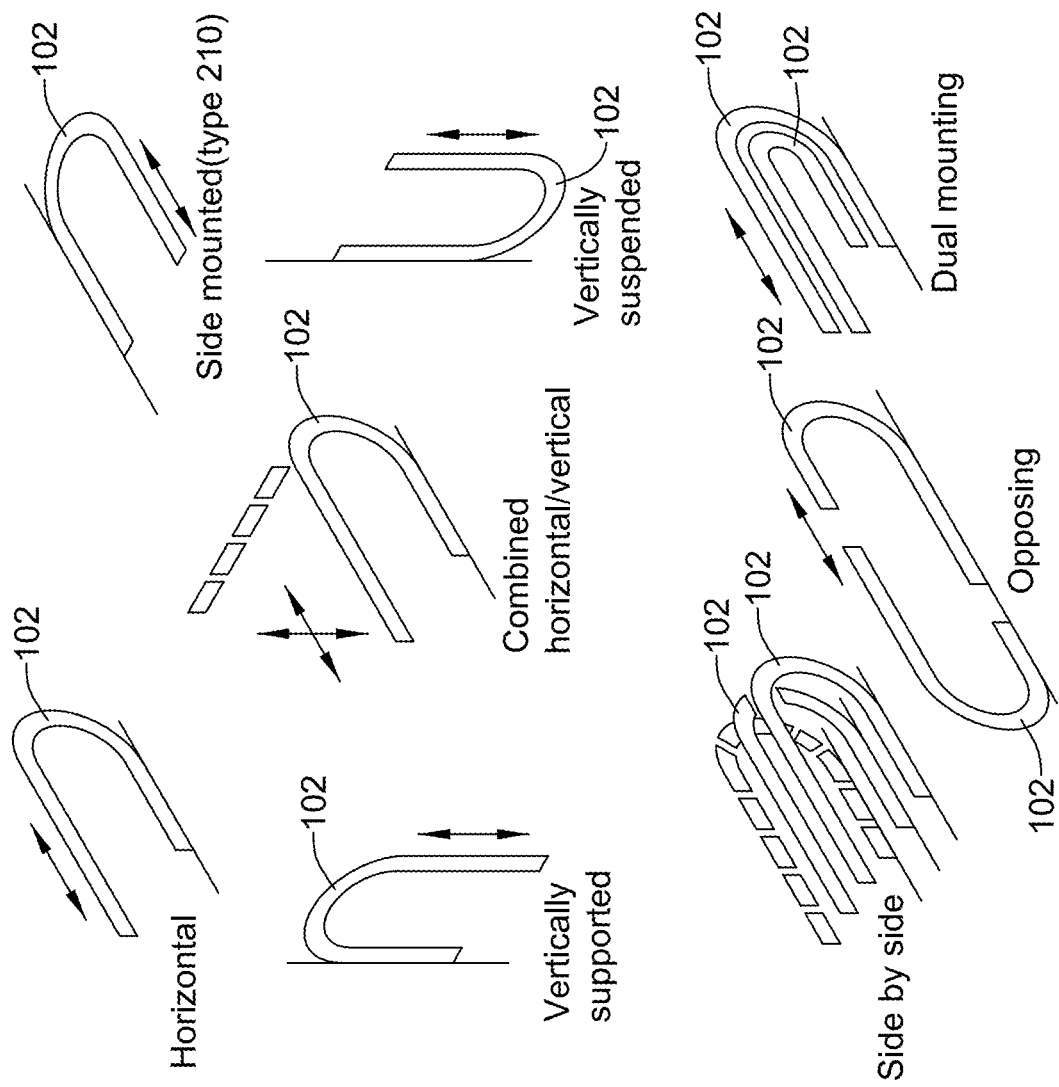
FIG. 9E show illustrative orientations of the illustrative cable carrier of FIG. 9D.

FIG. 9D is a perspective view of an illustrative but non-limiting example of the cable carrier 102. As seen, the cable carrier 102 is configured to be flexible. The cable carrier 102 includes a first end 102a and a second end 102b. If one of the first end 102a and the second end 102b is fixed in position while the other of the first end 102a and the second end 102b is free to move, it will be appreciated that the cable carrier 102, by virtue of including a number of articulating links 103 can lengthen or shorten to accommodate movement of the flexible drive cable 38. For example, one of the first end 102a and the second end 102b may be secured to the housing 90 while the other of the first end 102a and the second end 102b may be secured to the gear box 92, which is adapted to move relative to the housing 90. By securing the flexible drive cable 38 relative to the cable carrier 102, the flexible drive cable 38 may be protected against kinking, and from adding additional friction to the system. The cable carrier 102 may be oriented in any desired orientation, including horizontal, vertical or even a combination of horizontal and vertical, as seen for example in FIG. 9E.

Figure 10:
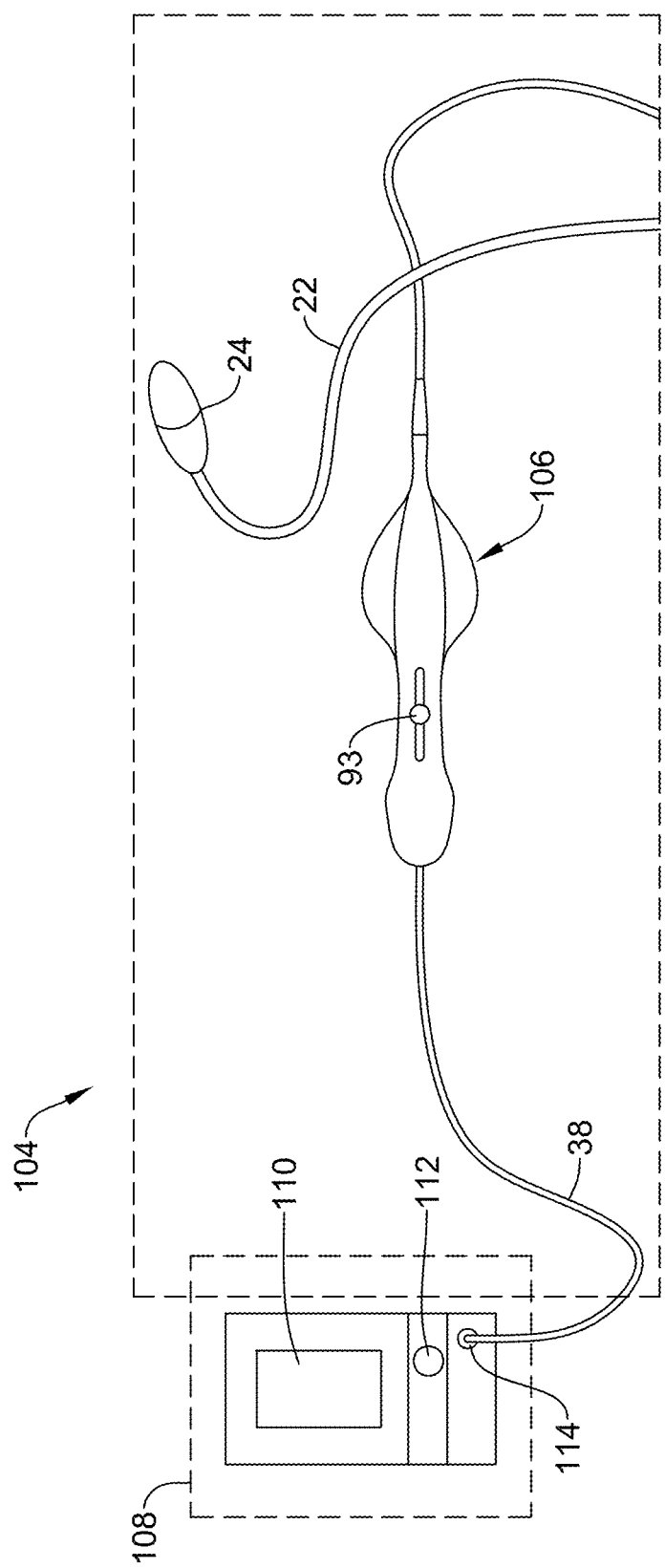
FIG. 10 is an example view of the illustrative atherectomy system of FIGS. 9A through 9C.

FIG. 10 is a schematic diagram of an illustrative atherectomy system 104. The atherectomy system 104 may be considered as being an example of the atherectomy system 98. The atherectomy system 104 includes an advancer 106 that houses the gear box 92 (not visible in FIG. 10) and includes the slider knob 93 extending therefrom. The flexible drive cable 38 extends from a console 108 that may be considered as an example of the drive assembly 18 or the drive assembly 46. The console 108 may include a display 110 providing appropriate information to the user as well as a control knob 112 that may be turned to increase or decrease the operating speed of the atherectomy system 104. The console 108 also includes a coupler 114 that is adapted to releasably secure the flexible drive cable 38 thereto.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. An atherectomy system, comprising:
   a drive assembly adapted for reuse, the drive assembly including:
      a drive motor having an output shaft;
      a first coupler segment secured relative to the output shaft;
      a controller adapted to regulate operation of the drive motor;
   an advancer assembly adapted for single use, the advancer assembly including:
      a flexible drive cable including a second coupler segment adapted to be releasably securable to the first coupler segment;
      gearing secured within the advancer assembly, the gearing operably coupled with the flexible drive cable;
      a burr catheter coupled with and extending distally of the gearing;
   wherein the advancer assembly is adapted to enable relative translation of the burr catheter in order to advance and withdraw an atherectomy burr rotatably secured to a distal end of the burr catheter.

2. The atherectomy system of claim 1, wherein the drive assembly comprises a reusable assembly.

3. The atherectomy system of claim 1, wherein the advancer assembly comprises a single use assembly.

4. The atherectomy system of claim 1, wherein the first coupler segment and the second coupler segment cooperate together to form a rotatable connection.

5. The atherectomy system of claim 1, wherein the advancer assembly further comprises a brake assembly that is adapted to releasably secure a guidewire extending through the burr catheter.

6. The atherectomy system of claim 1, wherein the advancer assembly further comprises a saline source adapted to provide saline through the burr catheter.

7. The atherectomy system of claim 1, wherein the advancer assembly further comprises:
   an advancer housing with the gearing disposed within the advancer housing; and
   a sled to which the advancer housing is slidingly secured such that sliding the advancer housing in a first direction relative to the sled causes the atherectomy burr rotatably secured to the distal end of the burr catheter to advance distally while sliding the advancer housing in a second, opposite, direction relative to the sled causes the atherectomy burr rotatably secured to the distal end of the burr catheter to withdraw proximally.

8. The atherectomy system of claim 1, wherein the advancer assembly further comprises:
   an advancer housing with the gearing moveably disposed within the advancer housing;
   a slider knob extending from the advancer housing and operably coupled with the gearing such that moving the slider knob in a first direction relative to the advancer housing causes the gearing and thus the burr catheter to advance distally while moving the slider knob in a second, opposite, direction relative to the advancer housing causes the gearing and thus the burr catheter to withdraw proximally.

9. The atherectomy system of claim 8, wherein the flexible drive cable is fixed relative to the gearing.

10. The atherectomy system of claim 9, wherein the advancer housing is adapted to accommodate a changing length of the flexible drive cable either between the drive assembly and the advancer assembly or within the advancer assembly as the gearing moves back and forth within the advancer housing.

11. The atherectomy system of claim 1, wherein the drive assembly further comprises a user interface operably coupled with the controller.

12. An atherectomy system, comprising:
    a drive assembly including:
       a drive motor having an output shaft; and
       a controller adapted to regulate operation of the drive motor;
    a flexible drive shaft adapted to be releasably securable to the output shaft of the drive motor; and
    an advancer assembly including:
       an advancer housing;
       gearing disposed within the advancer housing and configured to be coupled with the flexible drive shaft;
       a sled to which the advancer housing is slidingly secured; and
       a burr catheter coupled with and extending distally of the gearing;
    wherein sliding the advancer housing in a first direction relative to the sled causes an atherectomy burr rotatably secured to the distal end of the burr catheter to advance distally while sliding the advancer housing in a second, opposite, direction relative to the sled causes the atherectomy burr rotatably secured to the distal end of the burr catheter to withdraw proximally.

13. The atherectomy system of claim 12, wherein the advancer assembly further comprises a brake assembly secured to the sled, the brake assembly adapted to releasably secure a guidewire extending through the burr catheter.

14. The atherectomy system of claim 12, wherein the advancer assembly further comprises a saline source adapted to provide saline through the burr catheter.

15. The atherectomy system of claim 12, wherein the drive assembly further comprises a user interface operably coupled with the controller.

16. An atherectomy system, comprising:
  a drive assembly including:
    a drive motor having an output shaft; and
    a controller adapted to regulate operation of the drive motor;
  a flexible drive shaft adapted to be releasably securable to the output shaft of the drive motor; and
  an advancer assembly including:
    an advancer housing;
    a gearbox slidingly disposed within the advancer housing and adapted to be operably coupled with the flexible drive shaft;
    a slider knob extending from the advancer housing and operably coupled with the gearbox; and
    a burr catheter coupled with and extending distally of the gearbox;
  wherein moving the slider knob in a first direction relative to the advancer housing causes the gearbox and thus the burr catheter to advance distally while moving the slider knob in a second, opposite, direction relative to the advancer housing causes the gearbox and thus the burr catheter to withdraw proximally.

17. The atherectomy system of claim 16, wherein the flexible drive shaft is fixed relative to the gearbox.

18. The atherectomy system of claim 17, wherein the advancer housing is adapted to accommodate a changing length of the flexible drive shaft either between the drive assembly and the advancer assembly or within the advancer assembly as the gearbox moves back and forth within the advancer housing.

19. The atherectomy system of claim 16, wherein the advancer assembly further comprises a brake assembly that is adapted to releasably secure a guidewire extending through the burr catheter.

20. The atherectomy system of claim 16, wherein the drive assembly further comprises a user interface operably coupled with the controller.

* * * * *